United States Patent
Burd

(10) Patent No.: US 9,404,656 B2
(45) Date of Patent: Aug. 2, 2016

(54) OBLONG SWIRLER ASSEMBLY FOR COMBUSTORS

(71) Applicant: UNITED TECHNOLOGIES CORPORATION, Farmington, CT (US)

(72) Inventor: Steven W. Burd, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 677 days.

(21) Appl. No.: 13/717,232

(22) Filed: Dec. 17, 2012

(65) Prior Publication Data

US 2014/0165585 A1    Jun. 19, 2014

(51) Int. Cl.
| F23R 3/28 | (2006.01) |
| F23R 3/14 | (2006.01) |
| F23R 3/10 | (2006.01) |
| F23R 3/12 | (2006.01) |

(52) U.S. Cl.
CPC ... *F23R 3/28* (2013.01); *F23R 3/10* (2013.01); *F23R 3/12* (2013.01); *F23R 3/14* (2013.01); *F23R 3/286* (2013.01); *F05D 2260/14* (2013.01); *Y02T 50/675* (2013.01)

(58) Field of Classification Search
CPC .......... F05D 2260/14; F23R 3/10; F23R 3/12; F23R 3/14; F23R 3/286
See application file for complete search history.

(56) References Cited

U.S. PATENT DOCUMENTS

| 2,545,495 A * | 3/1951 | Sforzini | F23R 3/10 60/756 |
| 3,447,317 A * | 6/1969 | Dakin | F23R 3/14 431/183 |
| 4,288,980 A | 9/1981 | Ernst | |
| 4,763,482 A | 8/1988 | Wehner | |
| 5,351,475 A * | 10/1994 | Ansart | F32R 3/50 60/746 |
| 6,119,459 A * | 9/2000 | Gomez et al. | 60/748 |
| 6,354,072 B1 * | 3/2002 | Hura | 60/776 |
| 6,581,386 B2 | 6/2003 | Young et al. | |
| 8,297,057 B2 * | 10/2012 | Toon | 60/746 |
| 2008/0163627 A1 | 7/2008 | Elkady et al. | |

FOREIGN PATENT DOCUMENTS

EP    2743587 A2    9/2014

OTHER PUBLICATIONS

International Search Report and Written Opinion for related International Application No. PCT/US2013/068744; report dated Mar. 14, 2014.
Supplementary European Search Report; Application No. 13865651.7; Mailing Date: Dec. 10, 2015; 8 pages.

* cited by examiner

*Primary Examiner* — Phutthiwat Wongwian
*Assistant Examiner* — William Breazeal
(74) *Attorney, Agent, or Firm* — Cantor Colburn LLP

(57) ABSTRACT

In accordance with one aspect of the disclosure, a swirler is disclosed. The swirler may include an outer shroud and inner shroud. The inner shroud may be positioned radially inside the outer shroud. At least one of the outer shroud and inner shroud may have a major diameter which is larger than a minor diameter such that the shrouds define an oblong shape. The swirler may further include a plurality of vanes which may be positioned between the inner and outer shrouds.

20 Claims, 5 Drawing Sheets

OBLONG SWIRLER ASSEMBLY FOR COMBUSTORS

FIELD OF THE DISCLOSURE

The present disclosure generally relates to gas turbine engines and, more specifically, to a swirler of a combustor of a gas turbine engine.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and a compressor, such as a dual-spool compressor, rotate to draw in and compress the ambient air. The compressed air is then forced into the combustor, where a portion of the air is used to cool the combustor, while the rest is mixed with a fuel and ignited.

Typically, an igniter generates an electrical spark to ignite the air-fuel mixture. The products of the combustion and the remains of the air-fuel mixture then travel out of the combustor through a turbine as exhaust. The turbine, also a dual-spool configuration, is forced to rotate by the exhaust. The turbine, the compressor, and the fan are connected by an engine shaft, and in this case of a dual-spool configuration a pair of concentrically mounted engine shafts, running through the center of the engine. Thus, as the turbine rotates from the exhaust, the fan and the compressor rotate to bring in and compress new air. Once started, it can thereby be seen that this process is self-sustaining.

Combustors for gas turbine engines typically have a shell and a liner with an air passage defined therebetween. In an annular combustor an outer liner and an inner liner cooperate to define an annular combustion chamber between the inner and outer liners. In such a combustor, there is at least one igniter for igniting the air-fuel mixture. In some combustor designs, the liners may be segmented into panels.

The combustor further has a combustor bulkhead at a front end of the chamber extending from the outer shell to the inner shell. At least one fuel injector extends through this combustor bulkhead and into the combustion chamber to release the fuel. A swirler is generally positioned around each fuel injector to create turbulence in the combustion chamber and mix the combustion air and the fuel before the mixture is combusted.

In prior art designs, the swirler, including a housing and vanes, has a circular projection, that is, all radii of the swirler are equal. While effective, this circular projection may not adequately mix the air and the fuel in all situations, which may create difficulties in achieving the balance of emission, operability, and durability of the combustor and turbine. The round circular nature of the swirler may create further difficulties when utilized with annular combustors. Thus, a new swirler design is needed to achieve better mixing of the air and fuel, particularly with an annular combustor.

SUMMARY OF THE DISCLOSURE

In accordance with one aspect of the disclosure, a swirler is disclosed. The swirler may include an outer shroud and inner shroud. The inner shroud may be positioned radially inside the outer shroud. At least one of the outer shroud and inner shroud may have a major diameter which is greater than a minor diameter such that the shrouds define an oblong shape. The swirler may further include a plurality of vanes which may be positioned between the inner and outer shrouds.

In a refinement, the vanes may be positioned between the inner and outer shrouds in an oblong shape.

In another refinement, both the inner and outer shrouds may have an oblong shape.

In another refinement, the swirler may be oblong shaped at a proximal end, circular shaped at a distal end, and the inner and outer shrouds may transition from an oblong shape at the proximal end to a circular shape at the distal end.

In yet another refinement, the swirler may be oblong shaped at a distal end, circular shaped at a proximal end, and the inner and outer shrouds may transition from a circular shape at the proximal end to an oblong shape at the distal end.

In yet another refinement, a second swirler may be positioned around the first swirler.

In a further refinement, the second swirler may have an oblong shape.

In still another refinement, the swirler may be a component of a swirler assembly. The swirler assembly may include a plurality of swirler, each having oblong, circular, or a mixture of oblong and circular shapes.

In accordance with another aspect of the disclosure, a gas turbine engine having a compressor, a combustor, and a turbine axially aligned is disclosed. The turbine and compressor may be connected by a rotatable shaft. The combustor may have at least one swirler positioned through a forward bulkhead. Each swirler may include an outer shroud and inner shroud. The inner shroud may be positioned radially inside the outer shroud and at least one of the inner and outer shrouds may have oblong shapes. The swirler may further include a plurality of vanes positioned between the inner and outer shrouds.

In a refinement, the vanes may be positioned between the inner and outer shrouds in an oblong shape.

In another refinement, both the inner and outer shrouds may have an oblong shape.

In another refinement, the swirler may be oblong shaped at a proximal end, circular shaped at a distal end, and the inner and outer shrouds may transition from an oblong shape at the proximal end to a circular shape at the distal end.

In another refinement, the swirler may be oblong shaped at a distal end, circular shaped at a proximal end, and the inner and outer shrouds may transition from a circular shape at the proximal end to an oblong shape at the distal end.

In yet another refinement, the combustor may have an annular shape and the circumferential diameter of the swirler may be greater than the radial diameter of the swirler.

In a further refinement, the swirler shape may be symmetric about a centerline of the forward bulkhead.

In yet another refinement, the engine may further include a second swirler radially surrounding the first swirler and both swirlers may be oblong shaped.

In yet another refinement, the swirler may be a component of a swirler assembly which may include a plurality of swirlers. Each swirler may have an oblong shape, a circular shape, or a mixture of oblong and circular shapes.

In yet another aspect of the disclosure, a method of mixing air and fuel with an oblong swirler is disclosed. The method may include injecting fuel into a housing of the swirler by a fuel injection system and creating a mixing turbulence with air flowing through a plurality of air passages between a plurality of vanes disposed in the housing of the swirler in an oblong shape.

In a refinement, the method may further include providing a preferential premixing of the air and fuel with the housing of the swirler having an oblong shaped proximal end.

In another refinement, the method may further include dispersing the air-fuel mixture into a combustion chamber in a preferential air-fuel flow distribution by housing of the swirler having an oblong shaped distal end.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
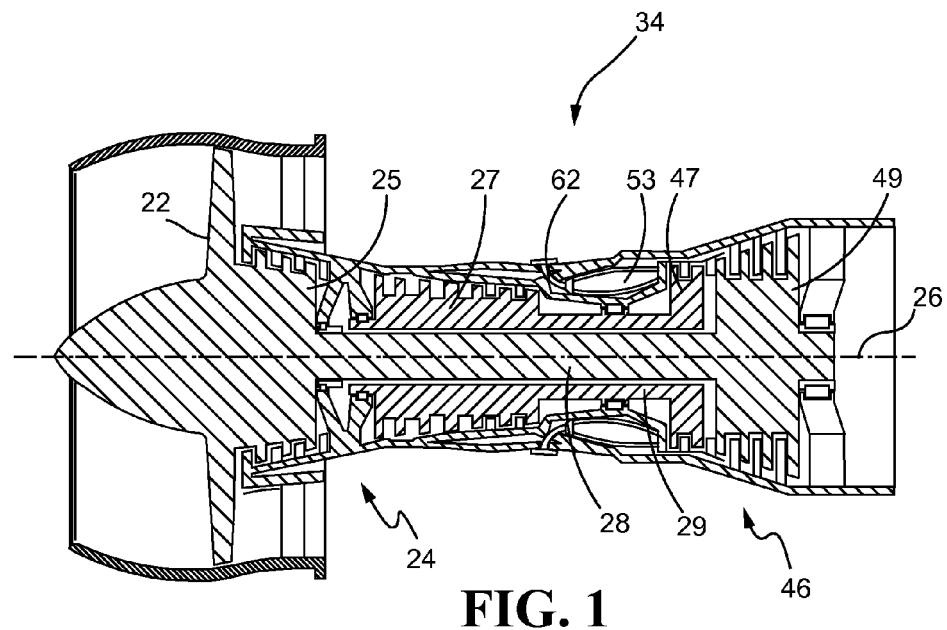
FIG. 1 is a cross-sectional view of a gas turbine engine constructed in accordance with the present disclosure.

Referring now to the drawings, and with specific reference to FIG. 1, a gas turbine engine, depicted as a turbofan engine, is disclosed and generally referred to by numeral 20. The engine 20 includes a plurality of axially aligned components beginning with a fan 22 and a compressor section 24. The fan 22 draws in ambient air by rotating around a central axis 26 on a first shaft 28, which extends through the engine 20 along the central axis 26. The compressor section 24 pictured is a dual-spool compressor, however other compressors are possible, having a low-pressure compressor 25 and a high-pressure compressor 27. The low-pressure compressor 25 compresses the ambient air by rotating on the rotating shaft 28 around the central axis 26 to create compressed air 32. The compressed air 32 flows to the high-pressure compressor 27 which rotates on a second shaft 29 concentrically mounted around the first shaft 28 to further compress the compressed air 32.

The compressed air 32 then flows from the compressor section 24 to a combustor 34 where the air 32 is split to be used as combustion air 36 and cooling air 38. Combusting the combustion air 36 with a fuel 40 in the combustor 34 creates an exhaust 42, which exits the combustor 34 at a rear end 44 and expands into the turbine section 46, pictured as a dual-spool turbine having a high-pressure turbine 47 and a low-pressure turbine 49. The expanding exhaust 42 causes the high-pressure turbine 47 to rotate on the second shaft 29 and the low-pressure turbine 49 to rotate on the first shaft 28, both around the central axis 26, and thereby drives the rotation of the corresponding compressors 25 and 27. Thus, new air is drawn into the engine 20 as the exhaust 42 exits the engine 20.

Figure 2:
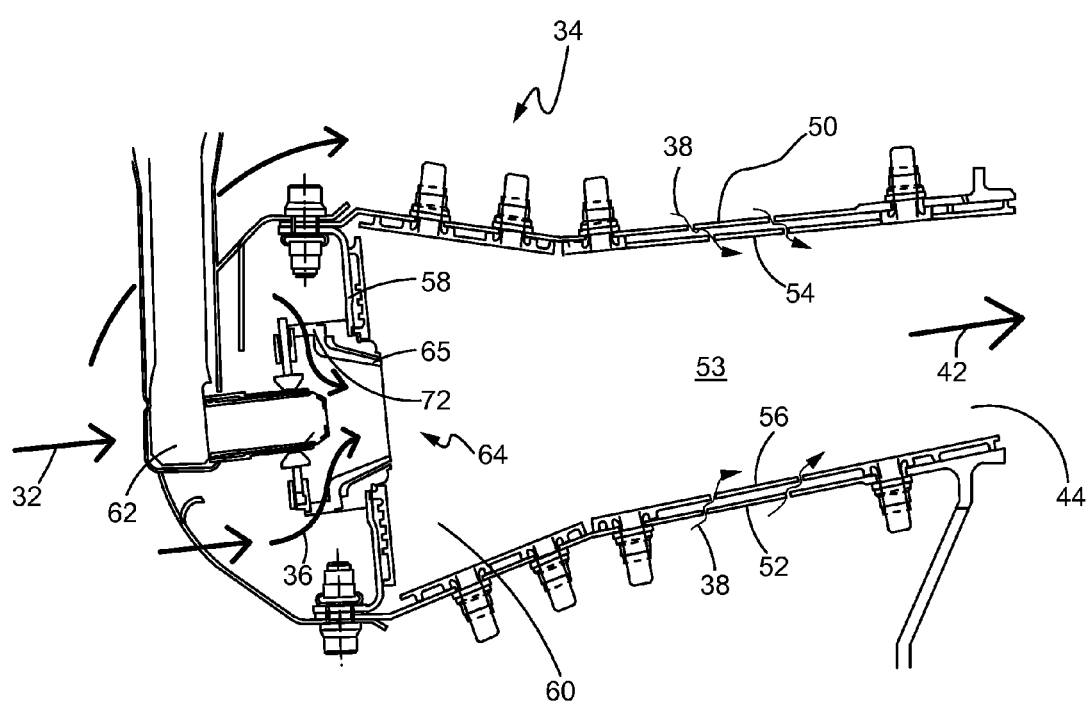
FIG. 2 is a cross-sectional view of an annular combustor constructed in accordance with the present disclosure.

The combustor 34 may be annular in shape, as shown in FIG. 2, and positioned around the central axis 26. The annular combustor 34 has an outer shell 50 and an inner shell 52 radially interior to the outer shell 50, which cooperate to define a combustion chamber 53 therebetween. Optionally, an outer liner 54 may be positioned radially inwards from the outer shell 50 and an inner liner 56 may also be positioned radially outwards from the inner shell 52. The liners 54 and 56 may act as a thermal barrier to protect the shells 50 and 52, respectively, from the high temperatures in the combustion chamber 53. A combustor bulkhead 58 may be of an annular shape and extend from the inner shell 52 to the outer shell 50 to define the front end 60 of the combustion chamber 53.

Figure 3:
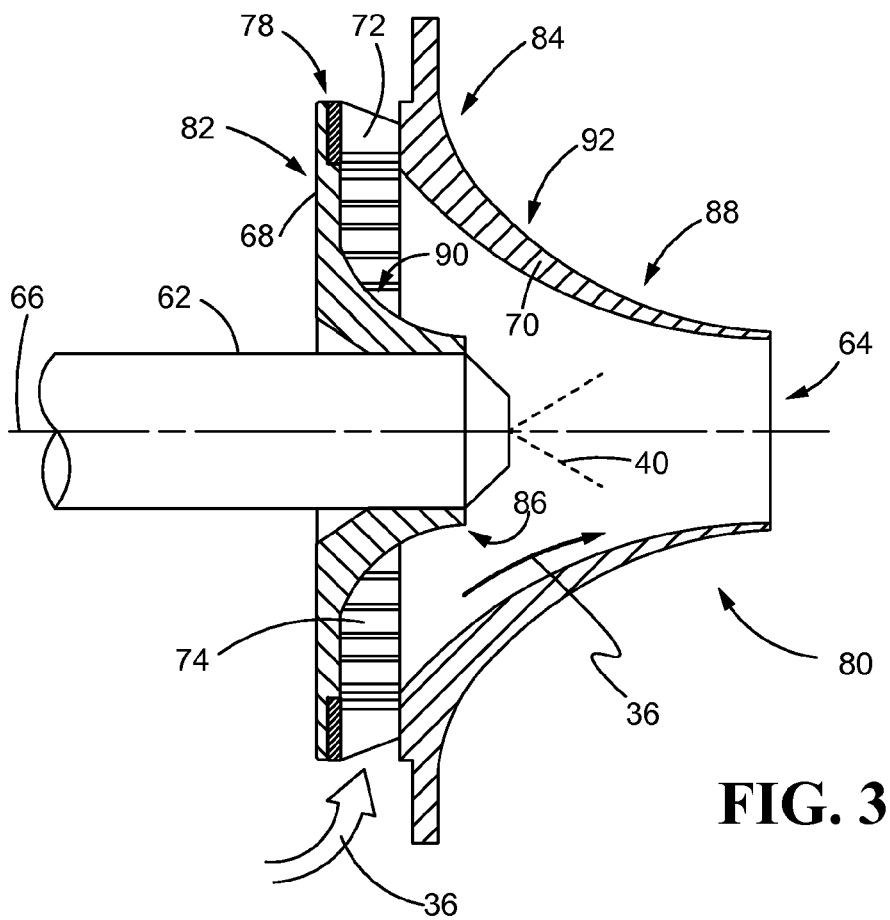
FIG. 3 is a cross-sectional view, perpendicular to the centerline of the combustor bulkhead, of a swirler and fuel injector constructed in accordance with the present disclosure.

At least one fuel injector 62 may extend through the bulkhead 58. The fuel injector 62 receives a flow of fuel 40 and disperses that fuel 40 into the combustion chamber 53 to be mixed and combusted with the combustion air 36. At least one swirler 64 is positioned around a swirler axis 66 extending axially through each fuel injector 62, as seen in FIG. 3, to allow combustion air 36 to enter the combustion chamber 53 and mix with the fuel 40. The swirler 64 has a swirler housing 65 which includes an inner shroud 68 positioned immediately around the fuel injector 62 and an outer shroud 70 positioned radially outward from the inner shroud 68. A plurality of swirler vanes 72 are positioned between the shrouds 68 and 70 such that combustion air 36 may enter into the combustion chamber 53 through a plurality of air passages 74 between the swirler vanes 72.

Figure 4:
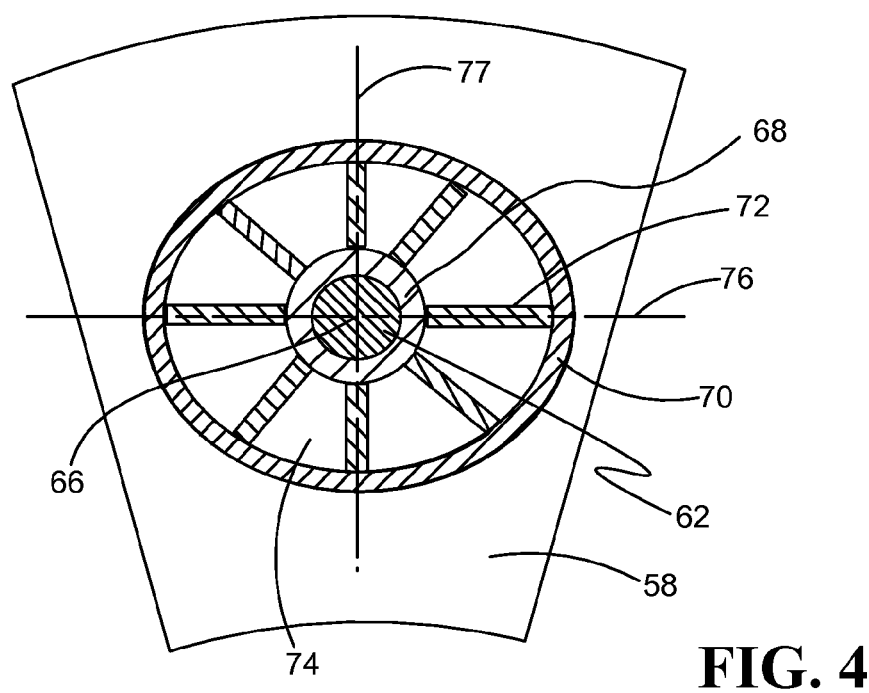
FIG. 4 is a front view of a combustor forward bulkhead incorporating a swirler constructed in accordance with the present disclosure.

As shown in FIG. 4, there may be a centerline 76 along the bulkhead 58 parallel to the shells 50 and 52 of the combustor 34 and extending through a circumferential diameter of each swirler 64. The swirler 64 may be oblong shaped, such that the shrouds 68 and 70 and the swirler vanes 72 have a circumferential diameter greater than a radial diameter, with respect to the central axis 26, and are symmetric about the centerline 76. However, this is only one exemplary embodiment, and any oblong shape is possible with any symmetry or no symmetry.

The adjective "oblong" used herein is defined as a roughly circular shape having a circumferential diameter greater than a radial diameter with respect to the central axis 26, as opposed to a circle which has an equal diameter in all directions. It is therefore intended that a swirler or swirler component having a major diameter extending in a circumferential direction about centerline 76 greater than a minor diameter extending in a radial direction about radial line 77 be considered to have an oblong shape. The shapes in the respective quadrants formed by lines 76 and 77 need not be symmetric about lines 76 and/or 77 nor common in geometry.

Figure 5:
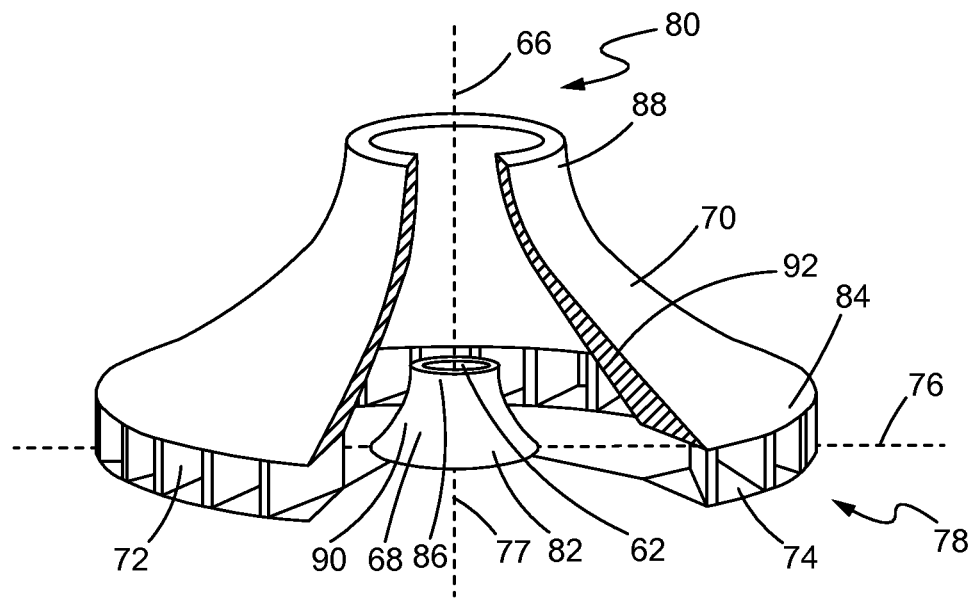
FIG. 5 is a perspective, partial cut-away, view of a swirler constructed in accordance with the present disclosure and detailing an oblong shape of a proximal end of the swirler.

Alternately, the swirler 64 may incorporate both circular and oblong shapes. For example, a proximal end 78 of the swirler 64 may be oblong as described above, while a distal end 80 of the swirler 64 may be circular, as in FIG. 5. In this embodiment, the swirler vanes 72 and a proximal end 82 and 84 of the shrouds 68 and 70, respectively, have an oblong shape; while a distal end 86 and 88 of the shrouds 68 and 70, respectively, have a circular shape. The shrouds 68 and 70 may include a transitional wall 90 and 92, respectively, which smoothly extends from the oblong proximal end 82 and 84 to the circular distal end 86 and 88, respectively.

Figure 6:
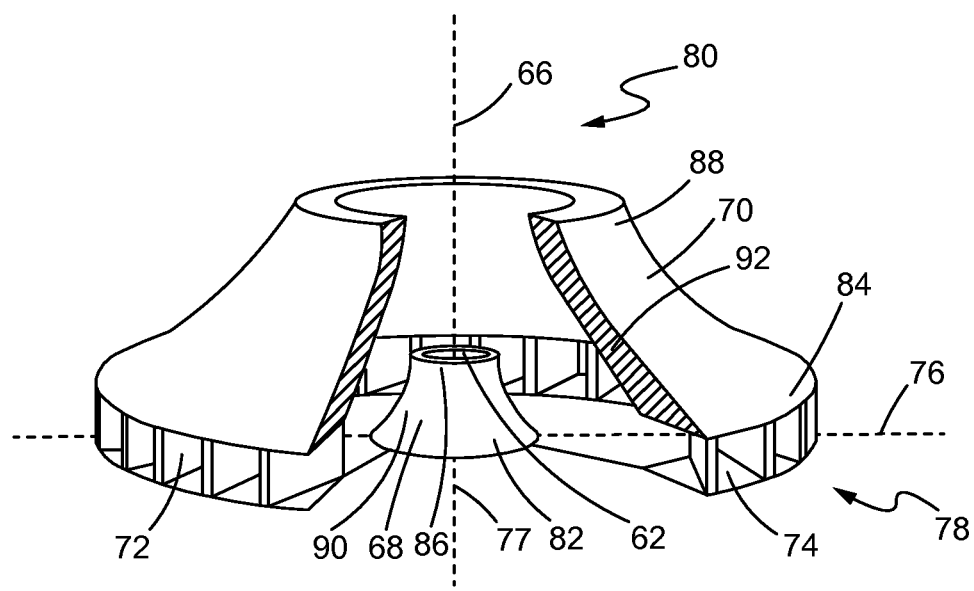
FIG. 6 is a perspective, partial cut-away, view of a swirler constructed in accordance with the present disclosure and detailing an oblong shape of a distal end of the swirler.

In another alternate embodiment, shown in FIG. 6, the distal end 80 may be oblong while the proximal end 78 may be circular. In this embodiment, the swirler vanes 72 and proximal ends 82 and 84 have a circular shape, while the distal ends 86 and 88 have an oblong shape. The transitional walls 90 and 92 smoothly extend from the circular proximal ends 82 and 84 to the oblong distal ends 86 and 88.

The oblong shape of the swirler vanes 72 improves the mixing of the combustion air 36 and fuel 40 by increasing the turbulence of the combustion air 36 entering into the swirler housing 65 through the air passages 74 over prior art circular swirler vanes. Additionally, the oblong shape of the swirler vanes 72 allow the combustion air 36 to be distributed in a more preferential arrangement, such as homogenously, throughout the combustion chamber 53, which will provide a more preferential mixing of the air 36 and fuel 40. The improvement to the air-fuel mixing is amplified by the oblong shape of the proximal end 78 of the swirler 64, which provides a larger space for the air-fuel mixing to take place and allows the air-fuel mixture to reach a more preferential distribution, such as a homogeneous distribution, than in a strictly circular swirler. The oblong shape of the distal end 80 of the swirler 64 allows for a more homogenous spread of the air-fuel mixture in the combustion chamber 53. This homogenous spread of the air-fuel mixture may be particularly beneficial in an annular combustor 34, which due to the geometry of the combustor 34, typically cannot achieve the same air-fuel spread with a circular swirler 34.

Figure 7:
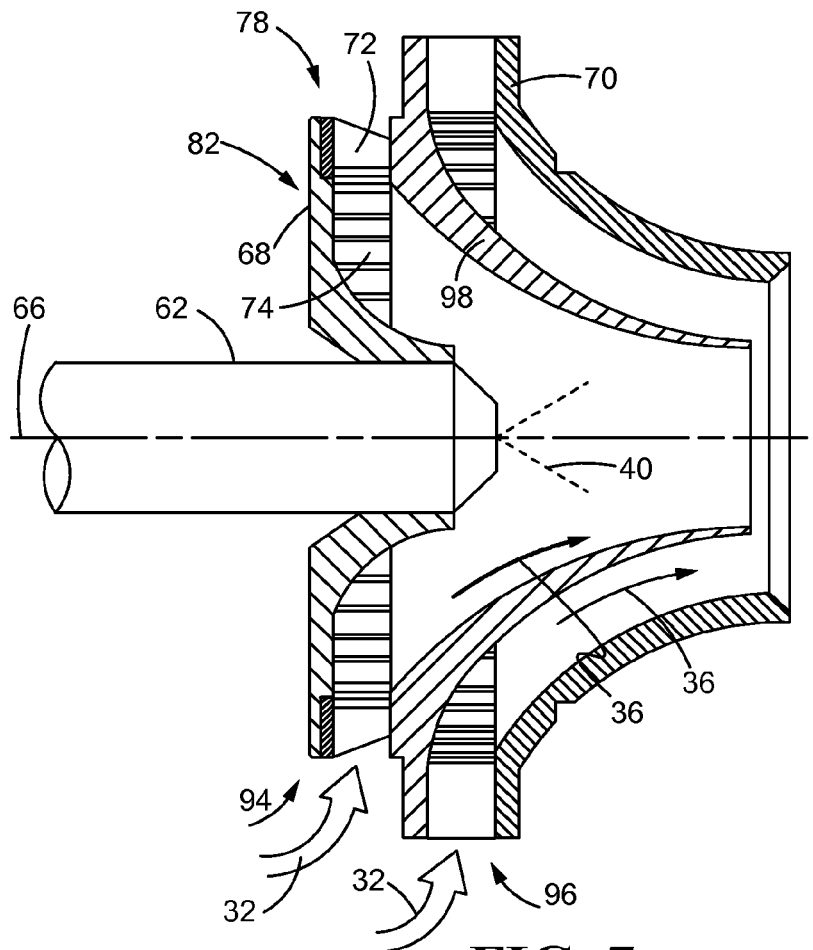
FIG. 7 is a cross-sectional view of a double swirler constructed in accordance with the present disclosure.

In one exemplary embodiment presented in FIG. 7, a first swirler 94 is positioned around the fuel injector 62 as described above and a second swirler 96 is positioned radially outward from the first swirler 94. In such an arrangement, the outer shroud 70 of the first swirler 94 and the inner shroud 68 of the second swirler 96 may be joined to create an inner cone 98.

Figure 8:
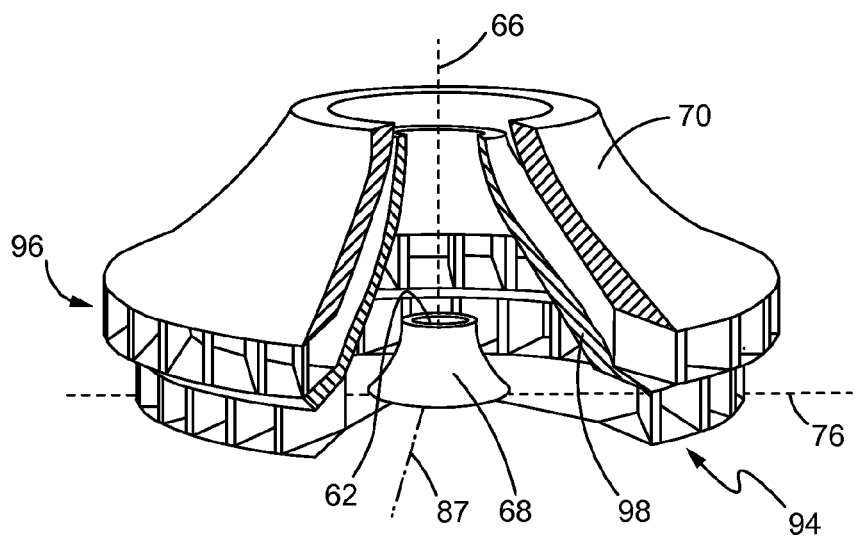
FIG. 8 a perspective, partial cut-away, view of a double swirler constructed in accordance with the present disclosure and detailing a mixture of circular and oblong swirlers.

In another dual-swirler assembly presented in FIG. 8, it can be seen that one or both of the swirlers 94 and 96 may have an oblong shape. In the embodiment presented, the inner swirler 94 and inner shroud 68 have a circular shape while the second swirler 96, inner cone 98, and outer shroud 70 have an oblong shape. However, any combination of oblong and circular shapes may be present in each swirler 94 and 96.

While the presented description has been in reference to a center-body fuel nozzle 53 of a fuel injector 62, alternate arrangements of fuel injection systems are possible, such as but not limited to fuel injection outboard of the swirler 64 or fuel injection within a swirler assembly 100. One such embodiment is presented in FIG. 9, wherein the fuel injector 62 has a central nozzle 53 as well as a plurality of fuel injection holes 102 positioned annularly around the fuel injector 62 and through a second inner wall 104 of the swirler assembly 100. The second inner wall 104 is positioned between a second axial wall 106 and the inner cone 98 of the swirler assembly 100.

Figure 9:
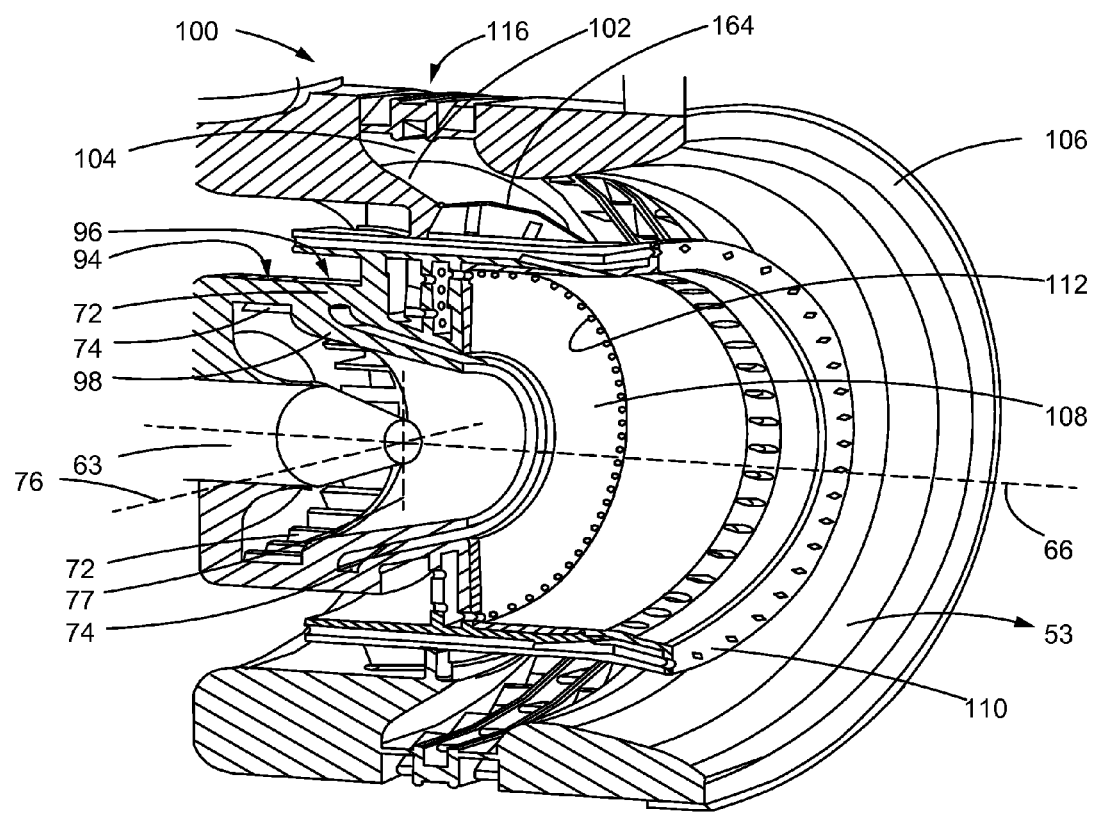
FIG. 9 is a perspective cross-sectional view of a swirler assembly constructed in accordance with the present disclosure.

The swirler assembly 100 of FIG. 9 also provides an exemplary embodiment of a multi-swirler assembly where a first swirler 94 is positioned around the central fuel nozzle 53 and a second swirler 96 is positioned radially surrounding the first swirler 94 with an inner cone 98 separating the two swirlers 94 and 96. Both the first and second swirlers 94 and 96 have an oblong shape as well as the inner shroud 68 and inner cone 98. Radially surrounding the second swirler 96 is a first inner wall 108 which is also of an oblong shape. A first axial wall 110 extends axially from an outer radial edge 112 of the first inner wall 108. The first axial wall 110 also defines an oblong shape around the swirler axis 66 and along the centerline 76. A second axial wall 106 is positioned radially outwards from and surrounding the first axial wall 110. The axial walls 106 and 110 are connected by the second inner wall 104. An oblong axial swirler 114 is disposed through the second inner wall 104. Additionally a plurality of oblong radial swirlers 116 are disposed through the second axial wall 106 near the second inner wall 104.

Alternate configurations of a swirler assembly 100 are possible, wherein the assembly 100 may include any number of swirlers 64, each swirler 64 may be oblong, circular shaped, or a mixture of oblong and circular shapes. The defining walls of the swirler assembly 100, while shown as oblong in FIG. 9, may be either oblong shaped or circular as desired. Any known fuel injection system may also be included in the swirler assembly 100.

INDUSTRIAL APPLICABILITY

From the foregoing, it can be seen that the oblong swirler disclosed herein has industrial applicability in a variety of settings such as, but not limited to mixing air and fuel in a combustion chamber of a gas turbine engine. The gas turbine engine may be utilized in conjunction with an aircraft for generating power and thrust or in land based systems for generating power. Using the teachings of the present disclosure, an oblong swirler may be constructed to create turbulence and alter the air distribution in a combustion chamber, and more specifically in an annular combustion chamber. This oblong shape of the swirler may increase the effectiveness of the turbulence created for mixing the air and fuel injected into the combustion chamber as well as distribute the air into the combustion chamber in a more preferential arrangement. The oblong swirler may also allow for the mixture to reach a preferential mix before entering into the combustion chamber.

There are, thus, several key benefits of this invention. First, the asymmetry introduced by the geometry of the swirler can provide an enhanced flow field (velocity, turbulence, shear, circulation) for mixing with the fuel introduced from the nozzle. This can provide enhanced premixing of the fuel-air before it is introduced to the combustor which is critical to emissions and reducing fueling complexity. The oblong geometry can provide preferential fuel-air distributions to the downstream combustor section to assist with mixing with other air sources (cooling, dilution, trim) and fuel-air mixtures from adjacent fuel nozzle-air swirler assemblies. This can positively impact the ability to get optimal fuel-air in the vicinity of igniters and combustor exit temperatures and patterns (e.g. pattern and profile factors). An oblong assembly may also permit a lower-count fuel nozzle arrangement in a combustor of given mean radius. This can reduce weight and cost and it may provide better count coupling with the downstream turbine stage.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all embodiments falling within the scope of the claims.

What is claimed is:
1. A swirler, comprising:
   a first swirler comprising:
      an outer shroud and inner shroud, the inner shroud positioned radially inside the outer shroud, at least one of the outer and inner shroud having a major diameter which is greater than a minor diameter such that the inner and outer shroud define an oblong, the swirler having a first end and a second end, the inner shroud defining a first oblong shape at one or more of the first end and the second end and the outer shroud defining a second oblong shape at one or more of the first end and the second end; and a plurality of radial swirler vanes positioned between the inner and outer shroud.

2. The swirler of claim 1, wherein the plurality of radial swirler vanes are positioned between the inner and outer shroud in a third oblong shape.

3. The swirler of claim 1, wherein both the inner and outer shroud are oblong shaped.

4. The swirler of claim 1, wherein the first swirler is oblong shaped at a proximal end, circular shaped at a distal end, and the first swirler transitions from being oblong shaped at the proximal end to being circular shaped at the distal end, the proximal end being the first end and the distal end being the second end.

5. The swirler of claim 1, wherein the first swirler is oblong shaped at a distal end, circular shaped at a proximal end, and the first swirler transition from being circular shaped at the proximal end to being oblong shaped at the distal end, the distal end being the first end and the proximal end being the second end.

6. The swirler of claim 1, further comprising a second swirler positioned around the first swirler.

7. The swirler of claim 6, wherein the second swirler is oblong shaped.

8. The swirler of claim 1, wherein the swirler is a component of a swirler assembly, the swirler assembly comprising a plurality of swirlers having oblong, circular, or a mixture of oblong and circular shapes.

9. A gas turbine engine, comprising:
a compressor;
a combustor axially behind the compressor and having at least one swirler positioned through a forward bulkhead, each swirler including an outer shroud and an inner shroud, the inner shroud positioned radially inside the outer shroud, at least one of the inner and outer shroud being oblong shaped, the swirler having a first end and a second end, the inner shroud defining a first oblong shape at one or more of the first end and the second end and the outer shroud defining a second oblong shape at one or more of the first end and the second end, and a plurality of radial swirler vanes positioned between the inner and outer shroud; and
a turbine axially behind the combustor and connected to the compressor by a rotatable shaft.

10. The gas turbine engine of claim 9, wherein the plurality of radial swirler vanes are positioned between the inner and outer shrouds in a third oblong shape.

11. The gas turbine engine of claim 9, wherein both the inner and outer shrouds are a oblong shaped.

12. The gas turbine engine of claim 9, wherein the at least one swirler is oblong shaped at a proximal end, circular shaped at a distal end, and the at least one swirler transitions from being oblong shaped at the proximal end to being circular shaped at the distal end, the proximal end being the first end and the distal end being the second end.

13. The gas turbine engine of claim 9, wherein the at least one swirler is oblong shaped at a distal end, circular shaped at a proximal end, and the at least one swirler transitions from being circular shaped at the proximal end to being oblong shaped at the distal end, the distal end being the first end and the proximal end being the second end.

14. The gas turbine engine of claim 9, wherein the combustor has an annular shape and a circumferential diameter of the at least one swirler with respect to the combustor is greater than a radial diameter of the at least one swirler with respect to the combustor.

15. The gas turbine engine of claim 14, wherein the at least one swirler is symmetric about a centerline of the forward bulkhead.

16. The gas turbine engine of claim 9, further comprising an outer swirler radially surrounding the at least one swirler, wherein both the at least one swirler and the outer swirlers are oblong shaped.

17. The gas turbine engine of claim 9, wherein the at least one swirler is a component of a swirler assembly which includes a plurality of swirlers, each swirler having an oblong shape, a circular shape, or a mixture of oblong and circular shapes.

18. A method of mixing air and fuel with an oblong swirler thereby creating an air-fuel mixture, comprising:
injecting fuel into a housing of the oblong swirler by a fuel injection system; and
creating a mixing turbulence with air flowing through a plurality of air passages between a plurality of radial swirler vanes disposed in the housing of the oblong swirler and arranged in a first oblong shape, the housing of the oblong swirler including an outer shroud and an inner shroud, the inner shroud positioned radially inside the outer shroud, the inner shroud defining a second oblong shape at one or more of a first end of the oblong swirler and a second end of the oblong swirler and the outer shroud defining a third oblong shape at one or more of the first end and the second end.

19. The method of claim 18, further comprising providing a preferential premixing of the air and fuel with the housing of the oblong swirler having an oblong shaped proximal end.

20. The method of claim 18, further comprising dispersing the air-fuel mixture into a combustion chamber in a preferential air-fuel flow distribution by the housing of the swirler having an oblong shaped distal end.

* * * * *